Figure 1:
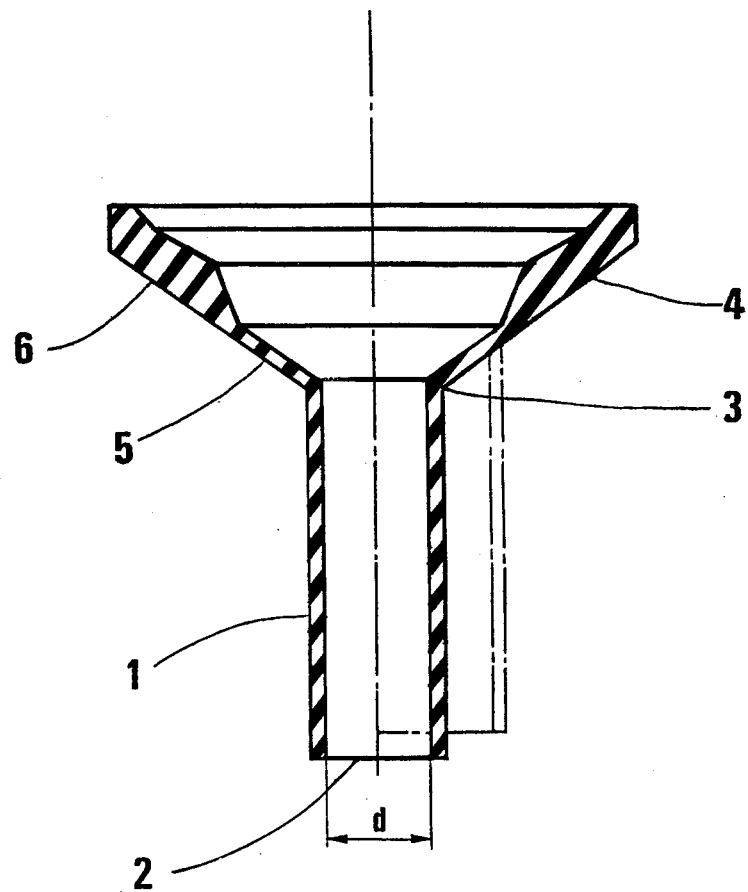

United States Patent [19]

Fillie

[11] 4,275,261
[45] Jun. 23, 1981

[54] END PIECE FOR HIGH VOLTAGE CABLES

[75] Inventor: Jean Fillie, Lagny sur Marne, France

[73] Assignee: Trefimetaux, Clichy, France

[21] Appl. No.: 753

[22] Filed: Jan. 3, 1979

[30] Foreign Application Priority Data

Jan. 11, 1978 [FR] France ................................ 78 01287
Nov. 21, 1978 [FR] France ................................ 78 33367

[51] Int. Cl.³ .......................................... H02G 15/064
[52] U.S. Cl. ...................................... 174/73 R; 174/80
[58] Field of Search ......................... 260/42.14, 37 M;
174/73 R, 80, 73 SC, 137 B, 127, DIG. 1;
427/215, 227, 228

[56] References Cited

U.S. PATENT DOCUMENTS

| 2,767,289 | 10/1956 | Robinson | 427/215 X |
| 3,407,090 | 10/1968 | Hertl | 427/215 |
| 3,412,200 | 11/1968 | Virsberg et al. | 174/127 X |
| 3,808,352 | 4/1974 | Johnson | 174/80 X |
| 3,950,604 | 4/1976 | Penneck | 174/73 R X |
| 4,001,128 | 1/1977 | Penneck | 174/DIG. 1 X |
| 4,045,604 | 8/1977 | Clabburn | 174/73 R X |

FOREIGN PATENT DOCUMENTS

| 1056223 | 4/1959 | Fed. Rep. of Germany | 174/73 R |
| 1266195 | 3/1972 | United Kingdom | 174/73 R |
| 1337951 | 11/1973 | United Kingdom | 174/73 R |
| 1434719 | 5/1976 | United Kingdom | 174/73 R |

Primary Examiner—Elliot Goldberg
Assistant Examiner—E. F. Borchelt
Attorney, Agent, or Firm—Dennison, Meserole, Pollack & Scheiner

[57] ABSTRACT

The invention relates to an elastomeric end piece intended for high voltage electric cables.

By incorporating into the elastomer one or more substances whose electrical impedance reduces as a function of the voltage applied, such as silicium carbide, zinc oxide doped with cobalt or bismuth, the titanates or zirconates of alkaline or alkaline-earth metals, the distortion of the radial electric field at the end of the cable which could cause disruptive breakdown is avoided.

Application to the end of high voltage electric cables, especially in polluted urban areas.

5 Claims, 4 Drawing Figures

END PIECE FOR HIGH VOLTAGE CABLES

The present invention relates to an improvement to end pieces, intended for high voltage electric cables and molded from elastomers which can be made vario-resistant.

Hereinafter, the term high voltages will be interpreted as electrical voltages of from 1 to 30 kilovolts between phases (sphere of "medium voltages") or even higher than 30 kilovolts between phases (sphere of "high voltages").

It is known that the ends of high voltage electric cables, which are usually installed in rather polluted urban areas, are of a shape which allows the external line of travel of an electric arc to be elongated, while at the same time maintaining overall compactness. This result is obtained by means of insulators having fins or skirts, which are generally produced from rigid or semi-elastic materials, necessitating mechanical assembly means and several different bores for adaptation to the different cable diameters. Another solution involves expanding a member made of elastic material beforehand, keeping it expanded by means of a spring system, then removing the spring when positioning the member on the cable.

Moreover, it is known that the lines of the radial electric field appear to be distorted at the end of a high voltage electric cable, these lines concentrating to the limit at which the semi-conductor screen is interrupted until it attains, and, at certain points, even exceeds the disruptive voltage. In order to avoid this disadvantage, it has been proposed to use the "vario-resistant" effect, also known as "varistor effect", of certain substances and particularly of crystalline silicon carbide whose electrical resistivity is known to vary as an inverse function of the voltage applied to it. German Pat. Nos 227 273 of 1909, in the name of Oerlikon, 10 79 182 of 1960, in the name of Siemens-Schuckert and British Pat. No. 503,218 of 1937, in the name of British Thomston Houston, as well as French Pat. No. 1 260 453 of 1960, in the name of A.S.E.A., describe vario-resistant coverings for ends of cables which are composed of varnishes incorporating very fine particled silicon carbide.

It has also been proposed in French Pat. No. 1 564 289 of 1968, in the name of Associated Electrical Industries Limited, to incorporate silicon carbide into elastomeric compounds to form sleeves for the ends of medium voltage cables.

The invention relates to an end piece intended for high voltage electric cables which solves the problem of protecting the ends of cables both by means of its shape and by means of its composition.

It is characterised by a cylindrical body which is open at one end and extended at the other end by a conical part which is widened out and is reinforced so as to maintain the rigidity required for good mechanical behavior. In addition, the opening angle of the cone is such that it compensates the reduction in the length of the cylindrical part caused by the extension thereof when it is slipped on to a cable whose diameter is larger than the internal diameter of the said cylindrical part. In practice, an angle of from 100° to 110° allows this result to be obtained.

Two or more of these end pieces can be slipped on to the end of the cable so as to reinforce the protection while at the same time elongating the lines of travel of an electric arc which would accidentally strike.

FIG. 1 in cross-section an end piece according to the invention.

Figure 2:
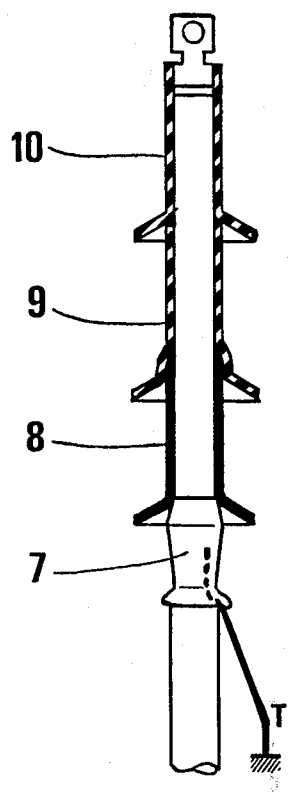
Figure 3:
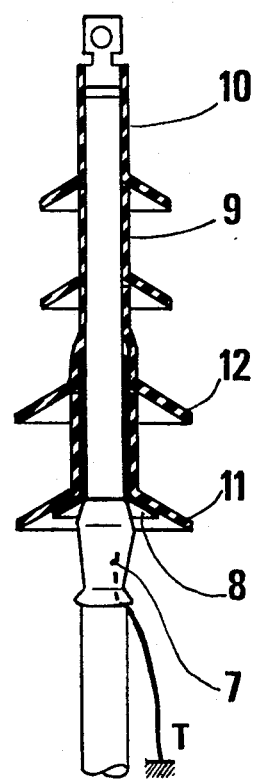
Figure 4:
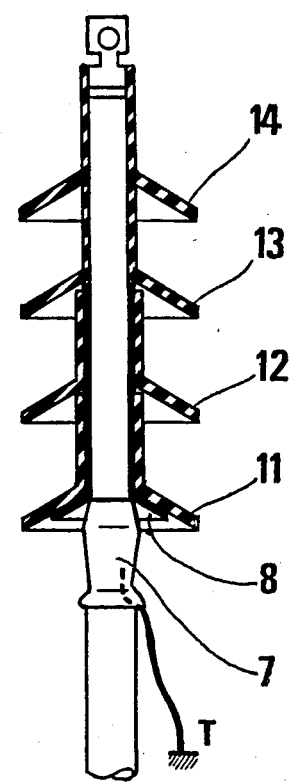

FIGS. 2, 3 and 4 represent in cross-section high ends of voltage electric cables, utilizing end pieces according to the invention.

In FIG. 1, the cylindrical part 1 has an internal diameter of "d" which is equal to or slightly smaller than the external diameter of the smallest cable on which it will be used. Since the insulated cables for medium voltages generally have external diameters of between 19 and 38 mm, the internal diameter "d" of the piece can be of the order of from 16 to 19 mm. The end 2 is open. The opposite end 3 is extended by a widened conical part 4 which allows good manual gripping in order to slip the piece on the end of the cable and elongates the line of travel of an electric arc which would accidentally strike from the conductor in the cable.

The first part 5 of the cone 4 is of a thickness which is substantially equal to that of the cylindrical part, that is to say about 1.5 to 3 mm. It can thus expand, owing to its elasticity, when slipped on to a cable having an external diameter which is greater than "d".

The final part 6 of the cone can advantageously be reinforced so as to maintain the rigidity required for good mechanical behavior.

It is, furthermore, preferable for the angle of opening of the cone to be such that it compensates the reduction in the length of the cylindrical part caused by the extension thereof when it is slipped on to a cable whose diameter is larger than the internal diameter of the said cylindrical part, that is to say that it be comprised between approximately 100° and 110°.

These pieces are easily manufactured by means of known molding methods, for example, from polymers such as EPDM (ethylene, propylene, diene monomer), which can be provided with the vario-resistant property (electric resitivity decreasing as a function of the voltage applied), by incorporating during preparation of the mixture, one or more substances whose resistance or other electrical characteristic such as the permittivity, that is to say, generally speaking, the simple or complex impedance, reduces as a function of the voltage applied.

Suitable substances include silicon carbide, zinc oxide doped with cobalt or bismuth, the titanates or zirconates of alkaline-earth metals, each metals or of lead, certain oxides or certain combinations of metallic oxides such as $Fe_3O_4$, manganese, zinc, nickel and barium ferrites, this list being given by way of example and not as a limitation.

Since some of these additives, in particular silicon carbide, have a hardness and a considerable abrasive power which is likely to damage the tools used for injecting and molding the elastomeric compositions into which they have been incorporated, it is advantageous to carry out a preliminary treatment aimed at reducing the abrasive effect. This treatment can involve a preliminary coating operation using a lubricant or a very thin elastomer, or again by superficial modification of the particles either by oxidation—a much softer film of $SiO_2$ is thus formed or by thermal decomposition of the SiC at a temperature of at least 2200° C. and, preferably, of between 2200° and 2400° C., to form graphite on the surface of the particles. Oxidation or thermal decomposition can be carried out in a known manner, for example in a fluidized bed, the heating means being of any known type, for example by induction or by plasma.

It is preferable to make the end piece arc-resistant in a known manner, for example by incorporating hydrated alumina into the elastomer in a proportion of from 100 to 200 parts by weight per 100 parts of elastomer.

FIG. 2 shows an end of a cable intended for an internal assembly which is not subjected to inclement weather and to pollution. It comprises, from top to bottom:

an elastic piece 7 made of arc-resistant EPDM (by incorporation of alumina) covering the ground connection T, an end piece formed by a flexible insulator 8 made of vario-resistant EPDM according to the invention, which is also made arc-resistant by incorporation of alumina, then two flexible insulators 9 and 10, made of arc-resistant EPDM.

The external diameter of the conical part of the various insulators has been fixed at 56 mm, this value being quite sufficient in the case of internal assembly.

FIG. 3 shows an end of a cable intended for an external assembly in an area which is only slightly polluted. It comprises, in succession:

a flexible piece 7 made of arc-resistant EPDM which covers the ground connection T, a vario-resistant EPDM insulator 8 according to the invention which is arc-resistant, is covered by two arc-resistant EPDM insulators 11 and 12 according to the invention, the diameter of the conical part having been increased to 85 mm.

then two EPDM insulators 9 and 10 which are identical to those in FIG. 2.

FIG. 4 shows an end of a cable intended for an external assembly in a polluted area. It shows the same elements as the preceding figures, but the diameter of the conical part of the two downstream insulators 13 and 14 has been increased to 85 mm to improve protection by elongating the lines of leakage.

In the various cases, the end piece 8 according to the invention has an internal diameter $d=19$ mm, a total length of 175 mm, an external diameter at the end of the conical part of 56 mm, and a thickness of 2 mm in the cylindrical part and at the point where the cylindrical part is connected to the cone.

It is very easy to slip these pieces on to cables having an external diameter of between 19 and 38 mm. A light application of silicone-based lubricant can, if necessary, simplify assembly and possible dismantling. The composition of the elastomeric mixture would allow very superior expansion, possibly attaining 600%, by means of a suitable modification in the shape of the cone, and, in particular, an extension of the part 5 which is of the same thickness as the cylindrical part.

The proportions of additives and of substances whose impedance varies as a function of the voltage can be situated in the following limits, given as parts by weight for 100 parts of elastomer:

Silicon carbide in particles smaller than 50 micrometers: ... 100 to 500 parts
Hydrated alumina: ... 50 to 200 parts
Doped zinc oxide: ... 50 to 100 parts
Barium titanate: ... 50 to 100 parts
Ferrites: ... 50 to 100 parts
Total of the various additions combined. 100 to 500 parts.

The additives which are conventional in the manufacture of elastomeers intended for high voltage electrical cables, such as carbon blacks, cross-linking agents, cross-linking accelerators, can also be added to these compounds.

EXAMPLE 1

A number of pieces according to FIG. 1 were molded from the following composition (by weight):
Ethylene propylene diene monomer. . . 100 parts
Silicon carbide in particles smaller than 50 µm: . . . 220 parts
Hydrated alumina: . . . 100 parts
Cross-linking agent (sulphur): . . . 1.5 part
Mercapto-benzothiazole: . . . 0.5 part (cross-linking accelerator)
Tetramethyl thiurame disulphide: . . . 0.5 part
Zinc di-O,O-butylphosphorodithioate: . . . 1.3 part They are sufficiently flexible to adapt themselves, without difficulty, to cables having diameters of from 19 to 38 mm.

EXAMPLE 2

A number of pieces according to FIG. 1 were molded from the following composition (by weight):
Ethylene propylene diene monomer: . . . 100 parts
Silicon carbide < 50 µm: . . . 100 parts
Zinc oxide doped with bismuth: . . . 100 parts
Hydrated alumina: . . . 100 parts
Cross-linking agent (sulphur): . . . 1.5 part
Mercapto-benzothiazole (cross-linking accelerator): . . . 0.5 part
Tetramethylthiurame disulphide: . . . 0.5 part
Zinc di-O,O-butyl phosphorodithioate: . . . 1.3 part They could also be adapted to ends of cables having diameters of up to 38 mm.

When combined in the manner indicated in FIGS. 2, 3 and 4, with insulators of the same shape but not containing vario-resistant additives, these pieces ensure the insulation and the equalization of the radial field at the ends of cables and thus eliminate any risk of breakdown, whatever the environmental conditions.

I claim:

1. A molded elastomer insulator for protecting the end of high voltage electric cables of a diameter of up to twice the diameter of said insulator, said insulator being of elongated cylindrical shape and having an open end, the other end being open and terminating in a flared conical portion, the included angle of the interior of the conical portion being between 100° and 110°, said insulator containing by weight from 100 to 200 parts of hydrated alumina per 100 parts of elastomer, said insulator being stretchable to accommodate and receive said cable.

2. A molded insulator as defined in claim 1 wherein the wall thickness of the conical portion at least for the major part thereof remote from the cylindrical portion of the insulator is greater than that of the elongated cylindrical portion.

3. A molded insulator as defined in claims 1 or 11, and further including in the elastomeric mix at least one substance whose electrical impedance diminishes as a function of voltage applied.

4. A molded insulator as defined in claim 3 wherein said substance is selected from the group consisting of crystalline silicon carbide of a particle size < 50 µm, zinc carbide doped with cobalt, zinc oxide doped with bismuth; titanates and zirconates of alkaline-earth metals, alkali metals, lead, iron oxides, manganese, zinc, nickel; and barium ferrites.

5. A molded insulator as defined in claim 4 wherein the total of said substance comprises between 100 and 500 parts by weight per 100 parts of elastomer.

* * * * *